United States Patent [19]

Shih

[11] Patent Number: 6,067,687
[45] Date of Patent: May 30, 2000

[54] WINDSHIELD WIPER BLADE ASSEMBLY

[75] Inventor: Mei-Hui Shih, Taipei, Taiwan

[73] Assignee: Lain Chuan Rubber Co., Ltd., Taipei, Taiwan

[21] Appl. No.: 09/110,210

[22] Filed: Jul. 6, 1998

[51] Int. Cl.$^7$ ..................................................... B60S 1/38
[52] U.S. Cl. ..................................................... 15/250.201
[58] Field of Search .................. 15/250.201, 250.351, 15/250.44, 250.43, 250.361

[56] References Cited

FOREIGN PATENT DOCUMENTS

| | | | |
|---|---|---|---|
| 433169 | 6/1991 | European Pat. Off. | 15/250.201 |
| 519826 | 12/1992 | European Pat. Off. | 15/250.201 |
| 565443 | 10/1993 | European Pat. Off. | 15/250.201 |
| 4017078 | 11/1991 | Germany | 15/250.201 |
| 2-303958 | 12/1990 | Japan | 15/250.201 |
| 2272831 | 6/1994 | United Kingdom | 15/250.201 |
| 2278270 | 11/1994 | United Kingdom | 15/250.201 |

*Primary Examiner*—Gary K. Graham
*Attorney, Agent, or Firm*—A & J

[57] ABSTRACT

A windshield wiper blade assembly having a primary yoke on which is mounted a spoiler which is formed with a curved front side and a generally triangular rear side, the spoiler having one end provided with a first bracket and another end provided with a second bracket, a bottom of the first bracket having two clamping members formed with two opposite semi-cylindrical recesses configured to fit into a first elongated opening of the primary yoke, the second bracket having two curved arms at two ends thereof configured to fit into a second elongated opening of the primary yoke, whereby the spoiler will give a downward pressure to the windshield wiper to prevent the windshield wiper from lifting from the windshield when the driving speed is high.

1 Claim, 4 Drawing Sheets

WINDSHIELD WIPER BLADE ASSEMBLY

BACKGROUND OF THE INVENTION

1. Field of the Invention

This invention is related to a windshield wiper blade assembly and in particular to one having a spoiler which gives a downward pressure to the windshield wiper against the windshield upon the bearing of the force of the wind.

2. Description of the Prior Art

It has been found that the conventional windshield wiper blade has a tendency to lift from the windshield when the driving speed is high. Hence, various kinds of improved windshield wipers have been developed to solve this problem. FIG. 4 illustrates a commonly seen prior art windshield wiper blade assembly 1 which includes a main yoke 11 having a spoiler 111 extending from the rim of one of the side walls of the main yoke adjacent to the wiper element. However, the spoiler 111 must be formed integrally with the main yoke 11, so that it will cause much difficulty in manufacture thereby increasing the costs.

Therefore, it is an object of the present invention to provide an improved windshield wiper blade assembly which can obviate and mitigate the above-mentioned drawbacks.

SUMMARY OF THE INVENTION

This invention is related to a windshield wiper blade assembly and in particular to one having a spoiler which gives a downward pressure to the windshield wiper against the windshield upon the bearing of the force of the wind.

It is the primary object of the present invention to provide a windshield wiper blade assembly which can give a downward pressure to the windshield wiper to prevent the windshield wiper from lifting from the windshield when the driving speed is high.

It is another object of the present invention to provide a spoiler which can be easily mounted on a windshield wiper blade assembly.

It is still another object of the present invention to provide a windshield wiper blade assembly with a spoiler which is simple in construction.

It is still another object of the present invention to provide a windshield wiper blade assembly with a spoiler which is low in cost.

It is a further object of the present invention to provide a windshield wiper blade assembly with a spoiler which is easy to manufacture.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1A is an enlarged sectional view of the bottom of the first bracket;

DETAILED DESCRIPTION OF THE PREFERRED EMBODIMENT

Figure 1:
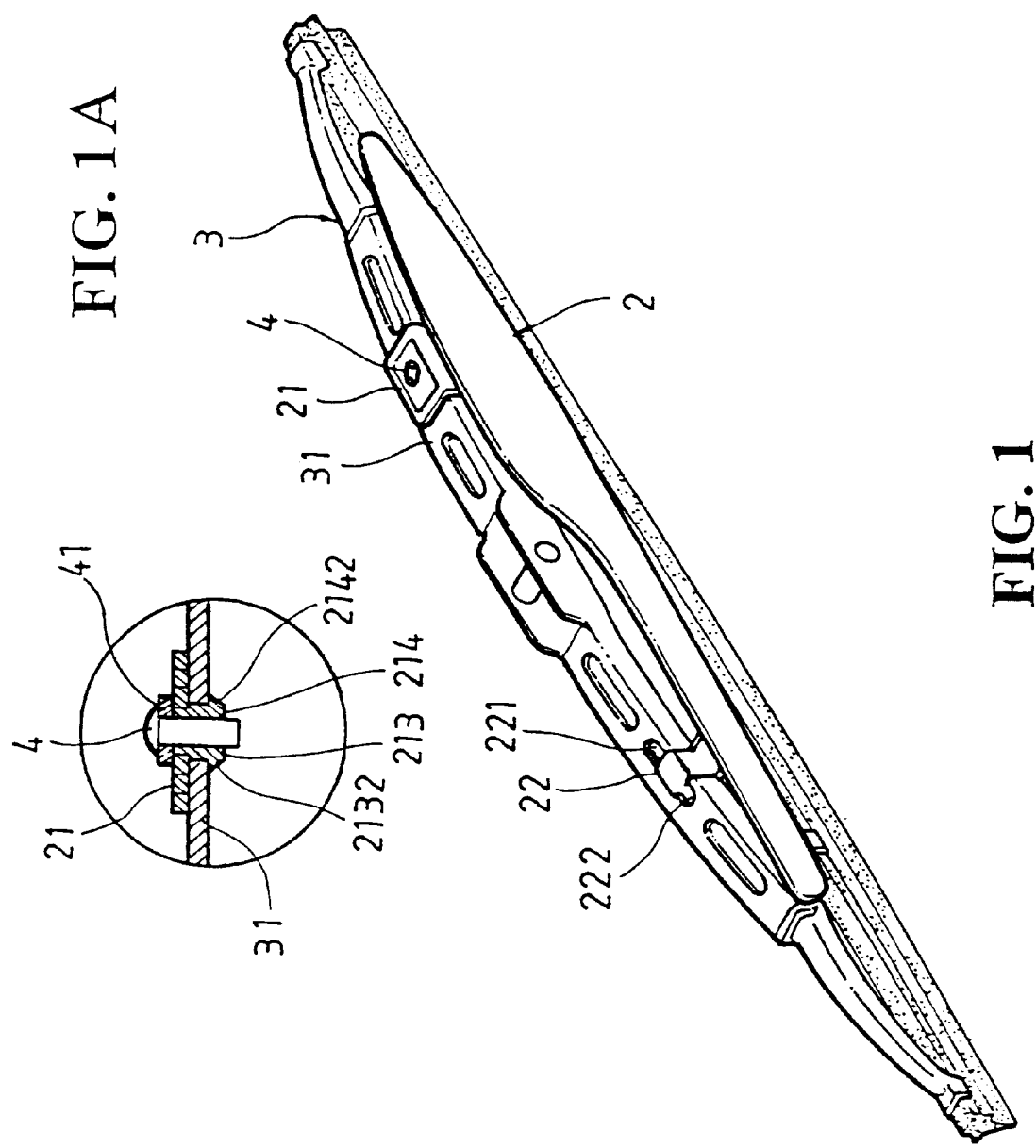
FIG. 1 is a perspective view of a windshield wiper blade assembly according to the present invention.
Figures 2, 2A:
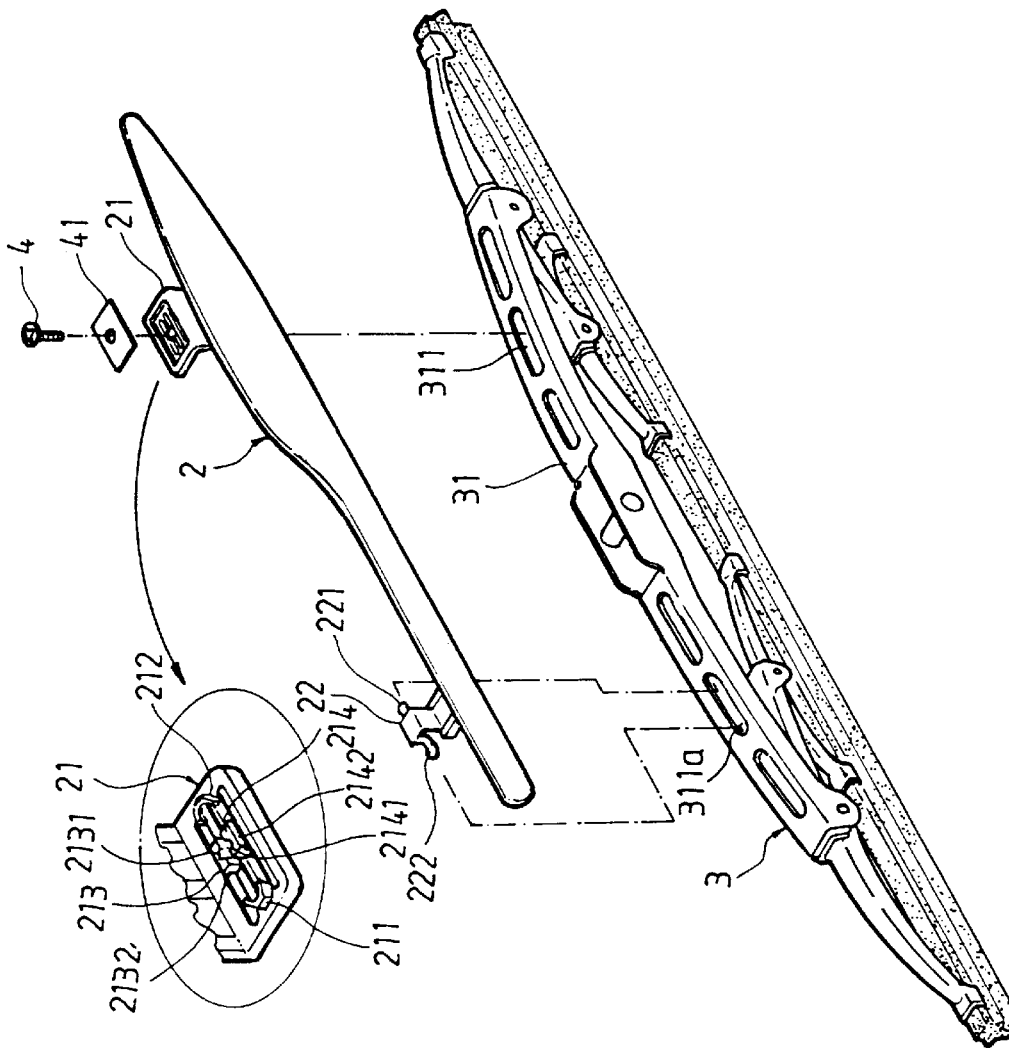
FIG. 2 is an exploded view of the windshield wiper blade assembly.
FIG. 2A is an enlarged fragmentary view of FIG. 2.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to the drawings and in particular to FIGS. 1, 1A, 2 and 2A thereof, the windshield wiper blade assembly according to the present invention generally comprises a windshield wiper blade 3 and a spoiler 2. The spoiler 2 has a curved front side 201 and a generally triangular rear side 202 (see FIG. 3). The spoiler 2 is provided with a first bracket 21 at one end and a second bracket 22 at another end. The bottom of the first racket 21 has two opposite fixing members 211 and 212 at two ends and two clamping members 213 and 214 at an intermediate position between the two opposite fixing members 211 and 212. The clamping members 213 and 214 are respectively formed with two opposite semi-cylindrical recesses 2131 and 2131 at the inner side and two flanges 2132 and 2142 at the bottom. The first bracket 21 is connected with the windshield wiper blade 3 by fitting the fixing members 211 and 212 and the clamping members 213 and 214 into an elongated opening 311 of the primary yoke 31 of the windshield wiper blade 3.

The second bracket 22 is provided at two opposite ends with two curved arms 221 and 222 adapted to engage with an elongated opening 311a of a primary yoke 31 of the windshield wiper blade 3. The curved arm 222 is longer than the curved arm 221 so that the second bracket 22 can be easily fitted in the opening 311a.

The spoiler 2 is firmly mounted on the windshield wiper blade 3 by fitting the second bracket 22 into the elongated opening 311a of the primary yoke 3, adjusting the position of the second bracket 22 so as to align the first bracket 21 with an elongated opening 311 of the primary yoke 3, and then engaging the fixing members 213 and 214 and clamping members 213 and 214 of the first bracket 21 into the elongated hole 311 of the primary yoke 3. Thereafter, a cover 41 is mounted on the first bracket 21 and a screw 4 is turned through the cover 41 into the first bracket 21 to expand the flanges 2132 and 2142 of the two clamping members 213 and 214 outwardly thereby firmly engaging the first bracket 21 with the windshield wiper blade 3.

Figure 3:
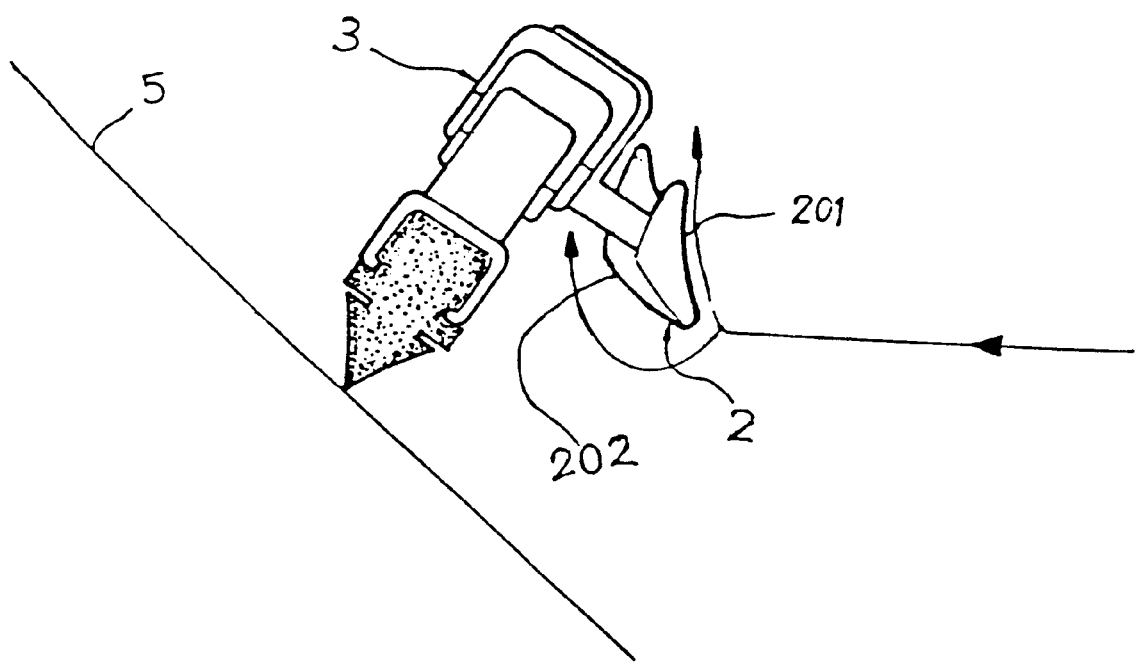
FIG. 3 illustrates the working principle of the windshield wiper blade assembly.
Figure 4:
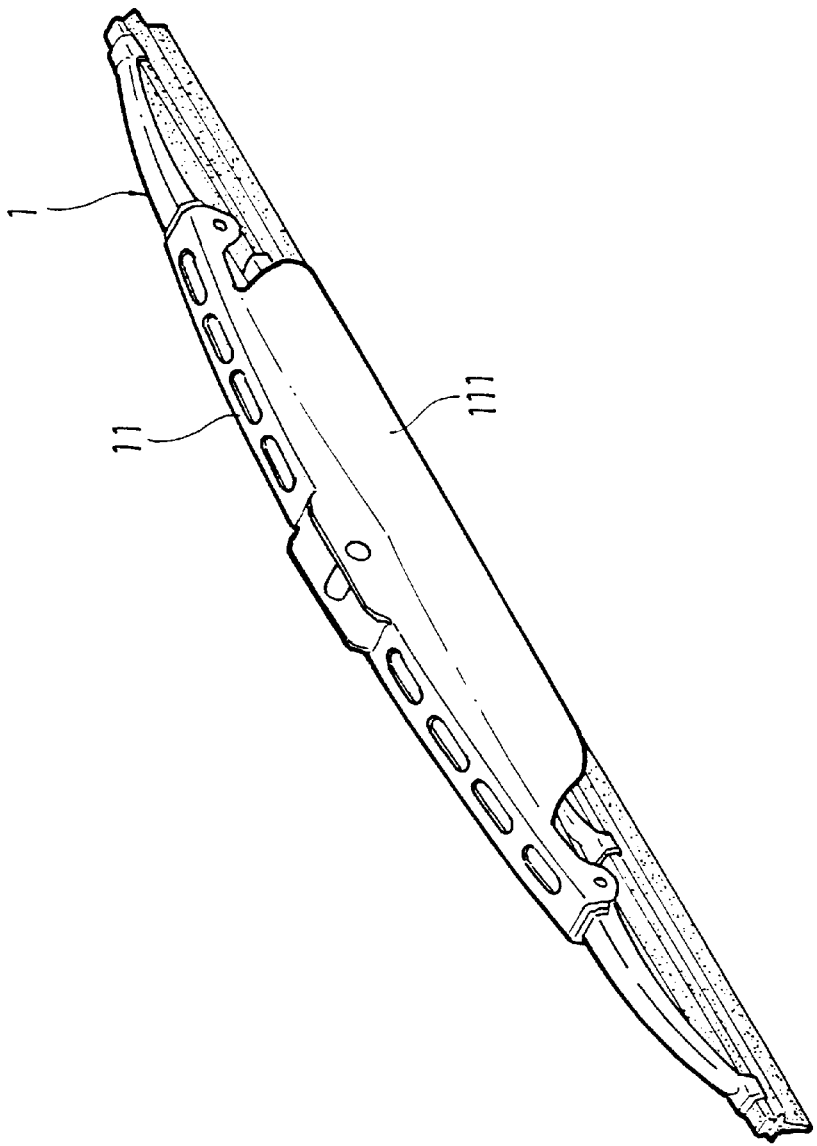
FIG. 4 is a perspective view of a prior art windshield wiper blade assembly.

Referring to FIG. 3, as the spoiler 2 has a curved front side 201 and a generally triangular rear side 202, the air stream passing through the curved front side 201 will be faster than that through the triangular rear side 201, so that a downward pressure will be applied to the spoiler 2 thereby preventing the windshield wiper blade 3 from lifting from the windshield 5.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. In a windshield wiper blade assembly having a primary yoke on which is mounted an elongated spoiler, said spoiler comprising a curved front side and a generally V-shaped rear side, said spoiler having one end provided with a first bracket and another end provided with a second bracket, a bottom of said first bracket having two clamping members formed with two opposed semi-cylindrical recesses, said clamping members being fit into a first elongated opening of said primary yoke, said second bracket having two curved arms at two ends thereof fit into a second elongated opening of said primary yoke, said first bracket being provided with two fixing members at two opposite ends thereof fit into said first elongated opening of said primary yoke, said curved arms of said second bracket being of different length.

* * * * *